June 5, 1923.
E. BEDNARZ
SIGNAL FOR VEHICLES
Filed July 13, 1922
1,458,023
2 Sheets-Sheet 2
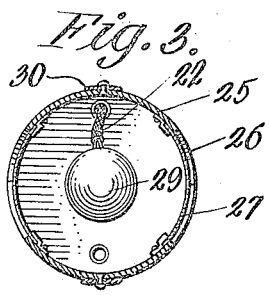
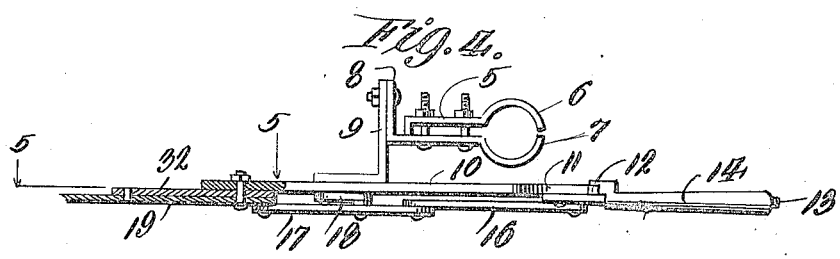
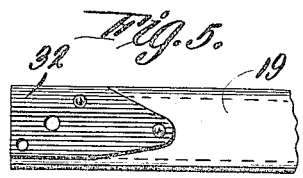
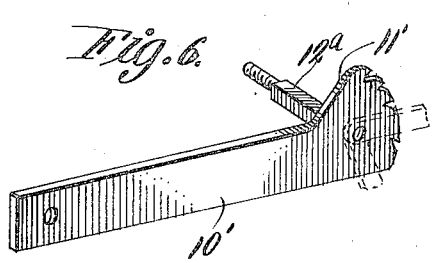
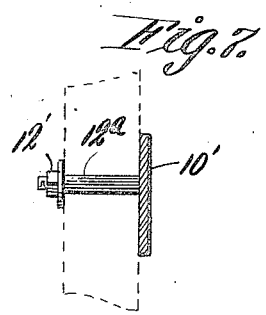
WITNESSES
Inventor
EDWARD BEDNARZ
By Richard B. Owen, Attorney Patented June 5, 1923.

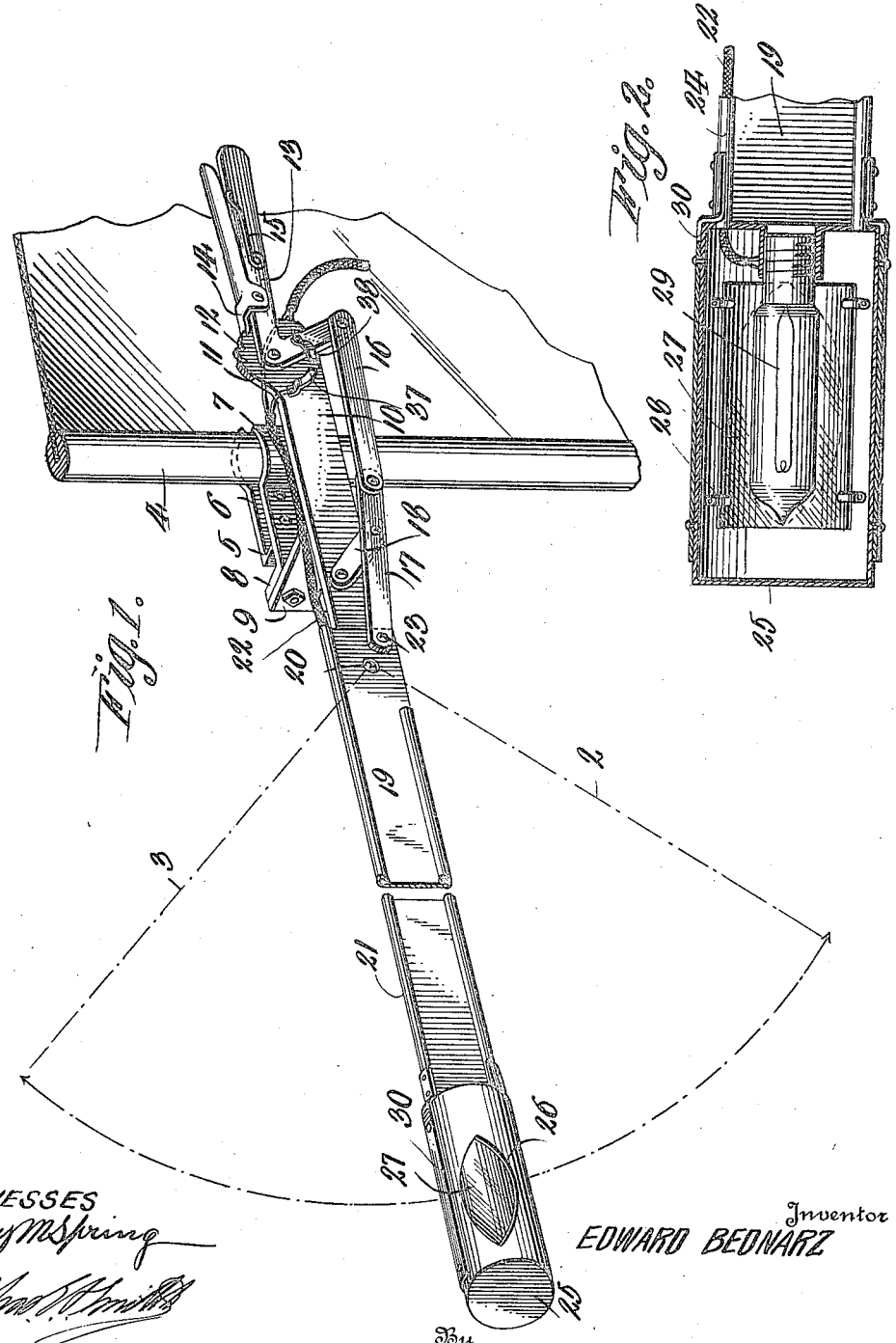

1,458,023

UNITED STATES PATENT OFFICE.

EDWARD BEDNARZ, OF EVERETT, WASHINGTON.

SIGNAL FOR VEHICLES.

Application filed July 13, 1922. Serial No. 574,703.

*To all whom it may concern:*

Be it known that I, EDWARD BEDNARZ, a citizen of the United States, residing at Everett, in the county of Snohomish and State of Washington, have invented certain new and useful Improvements in a Signal for Vehicles, of which the following is a specification.

The present invention relates to a signal for vehicles and especially for automobiles having for its principal object to provide simple and efficient means for warning pedestrians and other vehicle drivers of the intentions of the vehicle driver to which the device is attached.

Another important object of the invention is to provide a device of this nature which will be durable, comparatively inexpensive to manufacture, reliable in operation, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is a perspective of the signal,

Figure 2 is a longitudinal section through the light box on the semaphore arm,

Figure 3 is a transverse section therethrough,

Figure 4 is a fragmentary top plan of the device showing a portion in section,

Figure 5 is a detailed view taken substantially on the line 5—5 of Figure 4 looking in the direction of the arrows, Figure 6 is a detailed perspective of a modified form of the supporting arm, and Figure 7 is a transverse section taken therethrough.

Referring to the drawing in detail it will be seen that 4 designates an edge of an ordinary windshield to which is attached a bracket 5 which may be of any preferred construction but in the present instance, includes the jaws 6 and 7 which are bolted together so as to grip the edge 4 of the windshield and the shank 8 of the jaw 7 is bolted to the L-bracket 9 which in turn is fixed to the supporting arm 10 of the signal. This supporting arm 10 is normally disposed in a substantially horizontal position having its intermediate portion situated adjacent the edge 4 of the windshield and its inner portion terminating in a head 11 provided with a plurality of notches 12. A bell crank lever 13 is fulcrumed on the head 11 and has a dog 14 pivotally mounted thereon so as to engage the notches 12 of the head 11 and a spring 15 is mounted on the lever so as to hold the dog 14 in engagement with one of the notches 12. A pair of rods 16 and 17 are pivoted together at their ends while the other end of the rod 16 is pivoted to the bell crank lever 13. A link 18 is pivoted at one end to the supporting arm 10 and at its other end to the intemediate portion of the rod 17. A semaphore 19 is fulcrumed at 20 to the end of the supporting arm 10 and is provided with the rolled longitudinal edges 21 one of which is adapted to receive the wires 22. The rod 17 is pivoted at 23 to the semaphore 19 and it will therefore be seen that by fulcruming the bell crank lever 13 the semaphore may be placed in either of the positions indicated in Figure 1 by the dotted lines 1, 2 and 3 and by the full line structure of the semaphore.

A lamp casing 25 is mounted on the end of the semaphore and is of substantial cylindrical construction having suitable diametrically opposed elliptical shaped openings 26 with which register suitable panels 27 held in place by the clips 28 and an electric bulb 29 is mounted therein and connected to the wires 22 in any suitable manner. The lamp casing 25 is fixed on the end of the semaphore by the straps 30 which are riveted in any suitable manner to the edges of semaphore 19 and to the body of the casing 25.

As is shown to advantage in Figures 4 and 5 a plate 32 is disposed on the end of the supporting arm 10 so as to be situated between the semaphore and the supporting arm so that there will be two flat bearing surfaces in engagement with each other during the movement of the semaphore.

In Figures 6 and 7 a slightly modified form of the invention has been disclosed which is useful upon limousines or sedans or other closed models of vehicles wherein the supporting arm 10' is provided at its head 11' with a bar bolt 12ᵃ which may be passed through a portion of the closed body and held in engagement therewith by a nut 12'.

It is thought that the construction and operation of the semaphore itself will now be clearly understood without a more detailed description of its operation. It is desired, however, to point out that I have provided a switch device in connection therewith which includes a pair of contacts 37 and 38, the contact 37 being carried on the supporting arm 10 and the contact 38 on one arm of the bell crank lever 13. When the semaphore 19 is in position number 1 the contacts are separated from each other thereby breaking the circuits formed by the wires 22 and electric bulb 29 while when the semaphore is in any of the other three indicated positions these contacts are in engagement with each other and the electric bulb will be illuminated. It is, of course, understood that the contacts 37 and 38 are suitably insulated from the arm 10 and the arm of the bell crank lever 13.

The modifications of the invention which I have disclosed refer to the preferred examples thereof and it is to be understood that numerous changes in the details of construction and in the combination and arrangement of parts may be resorted to without departing from the scope of the invention as hereinafter claimed.

Having thus described my invention what I claim as new is:—

1. In combination, a supporting arm including a head having a plurality of notches arranged thereon, a bell crank lever pivoted on the head and provided with a spring pressed dog engageable with said notches, a semaphore pivoted on the supporting arm, and a rod connecting the semaphore with the bell crank lever in the manner and for the purpose specified.

2. In combination, a supporting arm, a bell crank lever pivoted on one end of the supporting arm, a semaphore pivoted on the other end of the supporting arm, a pair of rods pivoted together at one end and pivoted at their other ends to the semaphore and bell crank lever respectively.

3. In combination, a supporting arm, a bell crank lever pivoted to one end of the supporting arm, a semaphore pivoted to the other end of the supporting arm, a pair of rods pivoted to each other at one end and at their other ends to the semaphore and bell crank lever, and a link pivoted at one end to the supporting arm and at its other end to one of the rods.

4. In combination, a supporting arm, a crank pivoted to one end of the supporting arm, a semaphore pivoted to the other end of the supporting arm, a pair of rods pivoted to each other at one end and at their other ends to the semaphore and crank, and means pivoted at one end to the supporting arm and at its other end to one of the rods.

5. In combination, a supporting arm including a head having a plurality of notches arranged thereon, a crank pivoted on the head and provided with a spring pressed dog engageable with said notches, a semaphore pivoted on the supporting arm, and a rod connecting the semaphore with the bell crank lever in the manner and for the purpose specified.

6. In combination, a supporting arm including a head having a plurality of notches arranged thereon, a crank pivoted to one end of the supporting arm, a spring pressed dog on the crank engageable with the notches of the head of said supporting arm, a semaphore pivoted to the other end of the supporting arm, a pair of rods pivoted to each other at one end and at their other ends to the semaphore and crank, and a link pivoted at one end to the supporting arm and at its other end to one of the rods.

In testimony whereof I affix my signature in presence of two witnesses.

EDWARD BEDNARZ.

Witnesses:
L. G. PETERSON,
W. J. COLE.